(12) United States Patent
Defries et al.

(10) Patent No.: US 6,178,217 B1
(45) Date of Patent: Jan. 23, 2001

(54) NONLINEAR DIGITAL COMMUNICATIONS SYSTEM

(75) Inventors: Anthony Defries, Oyster Bay; Andrew Denis, Glencove, both of NY (US)

(73) Assignee: Neosoft, A.G., Zug (CH)

( * ) Notice: Under 35 U.S.C. 154(b), the term of this patent shall be extended for 0 days.

(21) Appl. No.: 08/886,133

(22) Filed: Jun. 30, 1997

Related U.S. Application Data (63) Continuation of application No. 08/649,976, filed on May 16, 1996, now Pat. No. 5,729,607, which is a continuation of application No. 08/288,708, filed on Aug. 12, 1994, now abandoned.

(51) Int. Cl.[7] .................................................. H04L 27/00
(52) U.S. Cl. ........................... 375/377; 380/252; 380/263
(58) Field of Search ............................ 380/6, 9, 31, 46, 380/48, 28, 34, 43, 49, 252, 263; 375/200, 285, 296, 346, 377, 259, 257, 254, 130; 455/39; 370/204, 529, 546

(56) References Cited

U.S. PATENT DOCUMENTS

| | | | |
|---|---|---|---|
| 3,573,624 | * 4/1971 | Hartmann | 325/42 |
| 3,718,765 | * 2/1973 | Halaby | 380/6 |
| 5,291,555 | * 3/1994 | Cuomo et al. | 380/6 |
| 5,404,298 | * 4/1995 | Wang et al. | 364/152 |
| 5,473,694 | * 12/1995 | Carroll et al. | 380/48 |
| 5,479,447 | * 12/1995 | Chow et al. | 375/260 |

* cited by examiner

*Primary Examiner*—Chi H. Pham
*Assistant Examiner*—Jean B. Corrielus
(74) *Attorney, Agent, or Firm*—Nixon & Vanderhye P.C.

(57) ABSTRACT

A multiple access communications data and information transport system and methodology for employing the noise present in any conduit as a carrier form using wireless chaotic waveform signals supported by nonlinear noise sustaining structures. The communications system utilizes digital devices and software embodying various algorithms designed to manipulate the nonlinear perturbations of any given conduit to establish a high bandwidth bidirectional, isochronous noise immune communications signal. Additionally, the system can be combined with any of a number of wireless or wireline communication methodologies to further enhance performance in terms of bandwidth, throughput, noise immunity, power consumption, cell size, and number of users without disturbing any concurrent signal traffic.

63 Claims, 7 Drawing Sheets

LOCAL TRANSCEIVER (ACTIVE/PASSIVE)

LOCAL CELL (30 - 300 FEET)

WIDE AREA TRANSCEIVER

WIDE AREA CELL (30 - 50 MILES)

NONLINEAR DIGITAL COMMUNICATIONS SYSTEM

This is a continuation of application Ser. No. 08/649,976, filed May 16, 1996 now U.S. Pat. No. 5,729,607 which is a continuation of U.S. application Ser. No. 08/288,708 filed Aug. 12, 1994, now abandoned.

FIELD OF THE INVENTION

This invention relates to a communication system which can use existing telecommunication or power infrastructures to provide higher data transfer volumes, at improved transmission throughput rates, and over a broader bandwidth. More particularly, this invention relates to an apparatus and method for carrying a desired signal on the noise components inherent to a particular conduit.

BACKGROUND OF THE INVENTION

Increasing the bandwidth of data transfer on transmission conduits is extremely important in today's high volume information transmission environment. The need for broader telecommunication bandwidths comes from several modern data transmission requirements. First, the higher bandwidths allow larger volumes of data to transmit in a shorter amount of time. This has become increasingly important as the size of data transmissions has continually grown. Modern examples of this desire for broader telecommunications bandwidths include the medical community's desire to a transmit optical images of, for example, x-rays and CAT scans between remote hospitals and physicians. Such transmissions require greater bandwidths to transmit the large size data files in reasonable amounts of time. Another example is the desire for interactive video in homes and offices, for such applications as in-home movies-on-demand and video teleconferencing. The size of the data files to provide home video and real time video are simply too large to be feasibly transmitted without large increases in the available effective transmission throughput.

Conventional approaches to signal transmission on conductive wire lines is to voltage modulate a signal onto the conduit at a frequency that lies within the bounds at which the conduit can electrically conduct the signal. Because of this conventional approach, known modes of conductive wireline transmission are limited in available bandwidth to a spectrum within which the conductive wire line is able to electrically transmit the signal via voltage modulation yielding a current flow. As a result, costly and complicated schemes have been developed to increase the bandwidth and throughput in conventional conductive wireline communications systems using sophisticated switching schemes or signal time-sharing arrangements. Each of these methods is rendered costly and complex in part because the systems adhere to the conventional acceptance that the conductive wire time provides an available bandwidth constrained by its conductive properties.

Several conventional methods have thus been developed to increase bandwidth for the transmission of telecommunications signals over conductive wire lines. These systems illustrative how conventional thinking has constrained the available bandwidth on conductive wire lines, unless expensive and complex systems were added to channel the information onto the conduit more rapidly. Some of these conventional methods are described in *Networked Media Sends A Messages,* New Media Maps (Nov. 1992) and is *ISDN: a snapshot Proceedings of IEEE,* Vol. 79 No. 2 (Feb., 1991) and are summarized below.

1. Conventional Method: Plain Oil Telephone Service (POTS)

Bandwidth: 4 Kbps—19.2 Kbps

POTS is offered over copper wires and represents the lowest level on the bandwidth spectrum. It generally records between 4 Kbps and 19.2 Kbps in available bandwidth, but can be upwardly adjusted with fast modem and data compression techniques.

For example, a 14.4 Kbps V.32bis modem coupled with a 4 to 1 signal compression of V.42bis will theoretically provide throughput of more than 50 Kbps. In practice, however, over a typical business line, data can only be moved at about 20 Kbps to 30 Kbps. Even utilizing V-Fast standards that run at 19.2 Kbps, with a total of 112 Kbps theoretically possible after data compression, many analysis believe that without improvements to the copper lines themselves, this is as fast as data transfer is going to get over dial-up copper lines without major infrastructure modifications.

2. Conventional Method: Switch 56

Bandwidth: 56 Kbps

This method requires a special, dedicated copper lines infrastructure and provides a single 56 Kbps channel. An installed base of these signal channel leased copper lines is in operation, and their greater bandwidth makes them a better choice than POTS for fast data transfer, such as for unidirectional video-conferencing. Installing the base of copper lines is, however, expensive. They are also limited to only the single 56 Kbps bandwidth channel and thus do not provide fast enough data transfer to support, for example, simultaneous video data conferencing.

3. Conventional Method: Basic Rate ISDN (B-ISDN)

Bandwidth: 56 Kbps×2 bearer+16 Kbps data

Integrated Services Digital Network (ISDN) provides two 56 Kbps voice grade channels and one 16 Kbps data channel. It requires expensive and complex digital switches, which transform all inputs into binary digits. ISDN requires a special structure, so for the ISDN to operate as a universal system for data transfer, approximately 700 million existing global telephone lines must be converted into the ISDN structure. So far, less than 1% of those lines have been converted to support the ISDN and those have been installed mostly in campuses or large company settings.

Standard ISDN, with two 56 Kbps channels and one 16 Kbps channel is sometimes referred to as narrowband ISDN (N-ISDN). Because of the limited bandwidth available in N-ISDN (112 Kbps+16 Kbps), it is inflexible for high resolution graphics, realtime video, medical imaging transmission and other high data volume applications. Available bandwidth under N-ISDN is not sufficient for modern or future requirements.

As a result of the bandwidth limitations of N-ISDN, various schemes have been proposed to increase the bandwidth of ISDN to Mbps levels. These methods are sometimes referred to as broadband ISDN (B-ISDN) and may involve multiplexing multiple channels. Schemes for multiplexing numerous N-ISDN channels, for example, may achieve bandwidths of several Mbps (ex. 29 channels×64 Kb/s=1.9 Mbps), but they do so at great cost. They require expensive switches and multiplexers, as well as sophisticated signaling schemes. Other forms (and drawbacks) of B-ISDN, including T1 multiplexing and ATM multiplexing, are discussed more specifically below. But, in general, B-ISDN can be characterized as providing higher data throughputs through the use of special and expensive switches and equipment.

4. Conventional Method: Switches 384 (Fractional T-1)

Bandwidth: 384 Kbps

At 384 Kbps Fractional T-1 provides enough bandwidth for 30 frames per second of low quality video utilizing an advanced version of the X.25 packet switching standard. This requires expensive modifications at both the central office as well as the customer premises.

5. Conventional Method: T-1, Primary Rate ISDN (PRI)

Bandwidth: 1.54 Mbps

T-1 provides a complete digital service, allowing 23 voice grade channels and two data channels. It does so, unfortunately, at great expense. To provide this T-1 capacity to residences for proposed video on demand services, for example, Bell Communications Research is proposing an Asymmetrical Digital Subscriber Line (ADSL) which would use electronic signal processing to raise weak transmissions to acceptable levels of 1.54 megabits per second (Mbps) across 18,000 feet over existing copper. Still in the prototype stage, ADSL, requires interface cards at the central company office and at residences, as well as a television decoder and line conditioning of various forms.

6. Conventional Method: Ethernet and Token Ring

Bandwidth: 10 Mbps & 16 Mbps

Ethernet is the dominant Local Area Network (LAN) architecture with a 10 Mbps rate. The IBM standard Token Ring is more costly and less open and provides up to 16 Mbps. Typically these methods provide adequate access to large digital data files via a small packet burst delivery mode, but suffer from significant performance problems with the delivery requirements of video and audio files, because it was designated to handle sporadic "Bursty" types of information not continuous high volume streams that require synchronization to a time base.

7. Conventional Method: T-3

Bandwidth: 45 Mbps

T-3 is the distribution backbone of the telephone system at 45 Mbps. It can provide broadcast quality NTSC video signals, but is extremely expensive to deploy, due to the number of voice grade lines (about 600) that must be multiplexed and demultiplexed using expensive hardware at both the central and customer facilities.

8. Conventional Method: Fiber Distributed Data Interface (TDDI)

Bandwidth: 100 Mbps

A development by IBM that provides a LAN and WAN technology to delivery 100 Mbps. FDDI has application over optic fibers or copper lines as the conduit. When utilizing fiber optics, FDDI can link up to 500 users at a distance of 500 kilometers. Cost of the fiber installation is extremely high. Copper line FDDI has been reasonably successful in computer local area networks but lack the original capacity of fiber optics that make it useful in broad deployments.

9. Conventional Method: Asynchronous Transfer Mode (ATM)

Bandwidth: 155 Mbps to multiple Gbps over optic fiber

ATM is an outgrowth of ISDN and is designed to integrate multiple data types at varying speeds with dynamic bandwidth allocation. Throughput starts at 155 Mbps, with theoretical limits approaching the Gbps level. ATM technology is extremely costly, requiring significant infrastructure outlay and modification and constant upgrading of the ATM switching software to control data flow and channel allocation.

With the exception of the fiber optic systems, all of the above systems constrain the available bandwidth by adopting the conventional approach to signal transmission, that is, to voltage modulate a signal onto a conduit at a frequency that lies within the bounds of the conduit's ability to support the signal through its conductive properties producing a current flow. As a result, the signals travelling on the conduit must be coordinated with other traffic by expensive switches, processors and protocols.

Bandwidth expansion has also been constrained in the wireless transmission area. There are several wireless modes of communications, chiefly cellular and traditional wireless. Cellular phase technology is currently straining at the boundaries of 19.2 Kb/Second of throughput (utilizing Cellular Digital Packet Data technology). The chief limitations of cellular throughput are a direct result of the Time Division Multiple Access (TDMA) schemes utilized, and the traditional analog approach to spectrum usage. Coupled with the noise and interference that accompanies these transmission modes, the noise floor rapidly overcomes the available power of the transmitter. As a result, the receivers are unable to separate noise from the information transmitted.

As is well known, conductive wireline communications and wireless communications suffer from performance limitations caused by signal interference, ambient noise, and spurious noise. In conventional transmission systems, these limitations effect the available bandwidth, distance, and carrying capacity of a transmission system employing the wireline or wireless communication systems. With both wireless and wireline communication systems, the noise floor and signal interference in the transmission conduit rapidly overcome the signal transmitted. This noise on the wireless or wireline communications conduit is a significant limitation to the ability of conventional systems to expand their available bandwidth.

The conventional wisdom for overcoming this limitation was to boost the power (i.e., increase the voltage of the signal) at the transmitter to boost the voltage level of the signal relative to the noise at the receiver. Without such boosting of the power at the transmitter, the receivers were unable to separate the noise from the desired signal. While some have tried to apply digital means to improve the signal-to-noise ratio while reducing power requirements, the overall performance of the systems is still significantly limited by the accompanying noise that is inherent in the transmission system used.

Qualcomm (U.S. Pat. No. 4,901,307), for example, has applied a digital Code Division Multiple Access system to achieve improvements in signal quality and power utilization, as well as a modest increase in bandwidth compared to TDMA technology, nevertheless, the improvements in bandwidth are relatively small.

Improving the transmission bandwidths across existing telecommunications conduits, without limiting carrying distances or capacities and without having to increase power to overcome noise floors, is desirable.

SUMMARY OF THE INVENTION

The present invention provides an increased available bandwidth over any conduit, whether conductive or nonconductive. The present invention achieves the increased bandwidth by indexing available frequency and by employing, as a carrier, a nonlinear chaotic noise signal inherently present on the conduit.

The frequency indexing aspect of the present invention occurs by treating disjunct frequency bands as if they were contiguous for transmission purposes. This allows available disjunct portions of the bandwidth to be pooled.

The present bandwidth pooling may be combined with another aspect of the present invention in which the chaotic noise signal on any conduit may be employed as the carrier for the desired signal transmission. For example, conductive conduit such as copper can support hundreds of megabits per second for multiple users over great distances of bandwidth with the present invention.

While the conventional approach to transmitting on conductive conduit was to voltage modulate a signal onto a conduit at a frequency that lies within the bounds of the conduit's ability to support the signal via its conductive properties, the approach of the present invention is to encode a signal with the naturally supported complex noise frequencies o the conduit. Specifically, the present invention mixes the desired signal with the noise signal that naturally occurs on the conduit. This results in a conduit that has carrier frequencies that the conduit naturally supports and that can be used as a noise sustained structure for the transmission of digital information.

Further, because different conduits have different naturally occurring complex noise frequencies, the signal input onto a particular conduit by the present invention will naturally attenuate outside of the conduit since the noise carrier that the desired signal is carried on in the conduit will not be supported in a different conduit medium.

These naturally occurring complex frequencies of a particular conduit are, in fact, chaotic noise structures that are present and are self-supporting in any non-homogeneous media such as copper, air, etc. These structures may appear to be noise or static, but are actually dynamic sets of complex frequencies that can be used as information carriers. Many important results stem from employing these noise structures as the signal carrier.

First, since the inherent noise structure on the conduit is used as a carrier, the signal transmission distance is not a direct function of the power requirements at the transmitter. The noise carriers are a self-supporting part of the conduit. When the carriers are used to support the transmission of the desired signal, the desired signal need not, and in fact should not overcome the noise carrier by boosting the transmit power for the desired signal substantially over the noise floor. The desired signal is in fact normalized to a level at or below the inherent noise floor of the conduit, rather than at a level that rapidly increases it.

Signal-to-Noise ratios of less than or equal to one are thus usable and, in fact, desirable with the present invention. This is entirely contrary to conventional wisdom that teaches boosting the signal-to-noise ratio to a point where the voltage level of the desired signal sufficiently exceeds the voltage level of the noise signal to distinguish the two signals from each other at the receiver. Since the present invention is able to receiver the desired signal from the noise carrier without boosting the voltage of the desired signal over the noise, the power level of the desired signal can be dramatically reduced while significantly increasing the carrying distance.

Second, since the noise structure on the conduit is a naturally occurring periodic perturbation induced by non-linear electromagnetic stimulation resulting in subharmonic bifurcations with long range phase coherence using this structure to carrying the desired signal is intrinsically security and privacy encoded. In fact, because the noise structure is chaotic, once the desired signal is modulated onto the chaotic noise signal, the resulting signal will appear as static, just as the noise carrier itself appeared before the desired signal was mixed in.

Third, the present communication system will support a much greater number of concurrent users at higher throughput than do traditional wireless/cellular or wireline systems. With the frequency indexing of the present invention, the total information being introduced to the conduit is broken apart and carried on independent carriers at different frequencies. Since the independent carriers are generally self sustaining noise components of the system itself, they will have minimal destructive interference with each other. In fact, when the independent carriers do interfere with each other, the interferences will not be self sustaining and will not be part of the carrier channel of the present invention.

Fourth, since data is carried on channels that have an identifiable self sustaining noise carrier, a broad range of spectral density profiles are available for data transmission.

Fifth, the present invention provides for bi-directional isochronous use of the bandwidth, for example, for interactive video, data or information transfer.

Sixth, the present invention provides larger bandwidths without modifying the existing telecommunication infrastructures. The desired signals are carried over existing conductive conduits or communications infrastructures, and do so without disturbing the current traffic on that infrastructure. Thus, for example, existing telephone lines can be used with POTS or other conventional technology while the present invention is using the same line to transmit hundreds of Mbits/s of data. Specifically, the present invention selects available frequencies to use as carriers during the pooling procedure and selectively avoiding frequencies that carry current traffic.

The present invention is not limited to conductive conduits. Because the present invention transmits the desired signal as a wireless waveform, it can use a waveguide either an electrical conductive medium (such as existing copper lines) or an electrically dielectric media (such as air). The present invention thus has application in high bandwidth wireless or cellular communications.

Finally, since the present invention provides a high degree of noise immunity, the system may be usable in areas where present day communication systems would be unable to function due to the noise levels.

The present invention contains various technologies as portions of the system:

First, a set of wired or wireless address resolution protocols are provided that allow the bandwidth of the connection between any two points to be managed and optimized by the intelligent selection of channel codes from the pool of available addresses.

Next, a software-based distributed switching and routing system is provided that effectively substitutes bandwidth allocation and/or address resolution for any form of dedicated or non-dedicated physical, electrical, mechanical, magnetic, electromagnetic, electronic, or other switching system.

A code switching scheme for the allocation of communication channels is included to allow the aggregate bandwidth of the entire available communication spectrum to be dynamically reallocated to increase or decrease channel bandwidths thereby optimizing or aggregate bandwidth and individual channel throughput.

A frequency translation method between available disjunct bands is included to increase the effective aggregate bandwidth. Code switching and frequency multiplexing processes are provided to allocate individual channels and segment the bandwidth based on spreading and channel codes.

Intelligent self determining software processes are included and employ channel switching for data management within the aggregate bandwidth. These processes implement code switching algorithms to maximize throughput of the individual channels as a function directly proportional to the band rate and inversely proportional to the signal to noise ratio.

Traditional coupling means may be used to bridge the transmitter/receiver onto any conduit.

The advantages and objects of the present invention will be understood by those in the art after careful review of the following descriptions, taken with the drawings, in which:

DETAILED DESCRIPTION OF THE PRESENTLY PREFERRED EMBODIMENT

In the present invention, a desired signal is transmitted over a conduit using the inherent noise structure on the conduit, rather than a conventional voltage modulated signal as a carrier. Since the noise structure is used as a carrier, greater throughput and usable bandwidth can be achieved without significant increases in the transmit power. This opens otherwise unavailable frequency spectrums for use in transmitting a desired signal, and permits significant bandwidth pooling to increase the total available bandwidth.

Each of these aspects of the invention is discussed in turn below.

CHAOTIC NOISE MODULATION

Figure 1A:
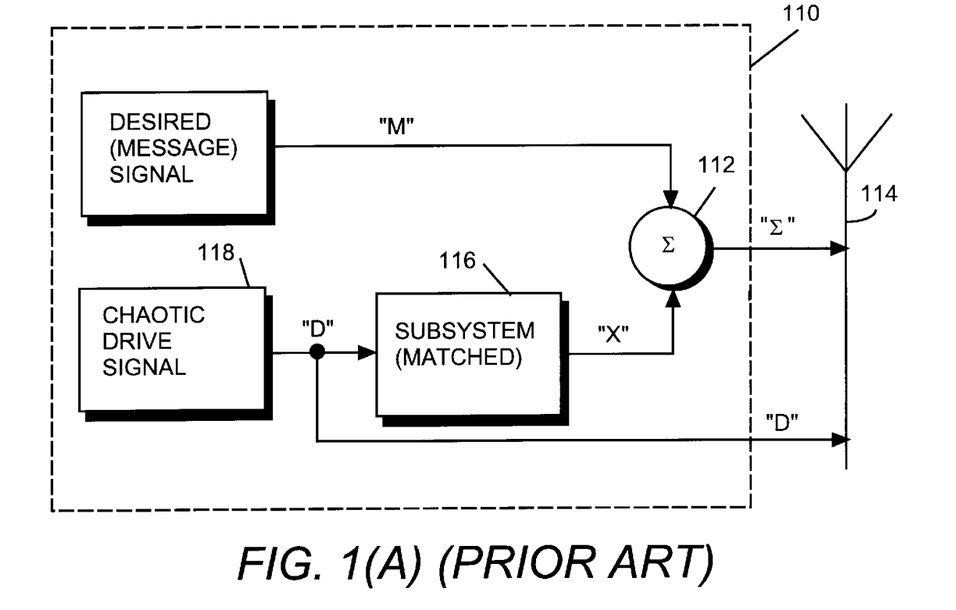
FIG. 1A is a schematic diagram of a prior art transmitter using a chaotic signal carrier.

FIG. 1A illustrates a prior deice that uses chaotic signals to transmit a desired message. This device loosely coincides with that described in the article *Mastering Chaos,* Scientific American, August 1993 by Ditto et al. In the device of FIG. 1A, a transmitter 110 is described in which a desired signal M is modulated onto a chaotic signal X before transmission.

The desired signal M is input to the mixer 112 (shown by example in FIG. 1A as an adder), together with a chaotic signal X. The sum of the message signal M and the chaotic signal X yields the mixed signal Σ which is transmitted by the antenna 114. The chaotic signal X is generated by a drive signal input D to a subsystem 116. The subsystem 116 reacts to the chaotic signal D generated by a chaotic drive signal generator 118 in a manner that creates a chaotic signal X. The chaotic signal X is stable, but is generally random in time and thus may appear as static or white noise. When the chaotic signal X is mixed with the desired signal M at the mixer 112, the mixed signal Σ also appears as a chaotic or noise-like waveform. The mixed signal Σ thus includes a non-chaotic component comprising the desired signal M and a chaotic component comprising the chaotic signal X. Since the chaotic component X is present in Σ, Σ itself will also appear chaotic and random in time, even though the desired signal M is also present and may be non-chaotic and identifiable in time.

Figure 1B:
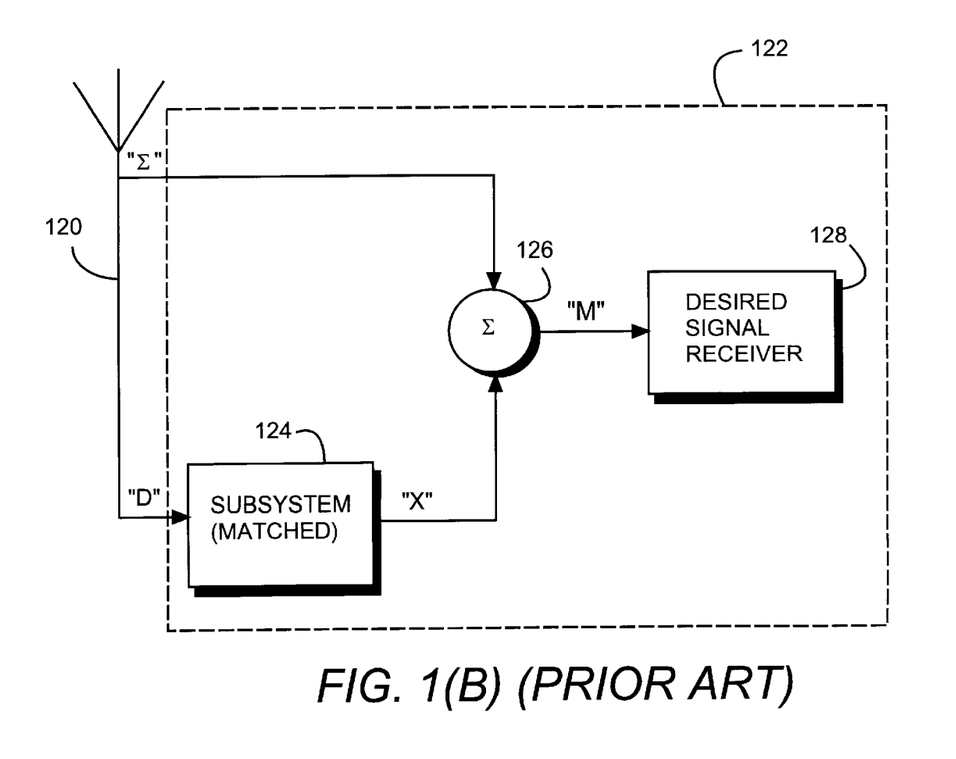
FIG. 1B is a schematic diagram of a prior art receiver using a chaotic signal carrier.

The antenna 114 transmits both the mixed signal Σ and the drive signal D to the antenna 120 in FIG. 1B. FIG. 1B shows the receiver 122 that communicates with the transmitter 110 of FIG. 1A. The antenna 120 of the receiver 122 receives the two signals, Σ and D, that were transmitted by the transmitter 110 of FIG. 1A. The receiver 122 includes a subsystem 124 that is matched to the subsystem shown in FIG. 1A such that the chaotic drive signal D, when introduced to either of the subsystem 124 of the receiver 122 or the subsystem 116 of the transmitter 110 will produce the same chaotic signal X.

The drive signal D is received by the antenna 120 of the receiver 122 and is input to the subsystem 124 to reproduce the signal X. Signal X is then demodulated from the mixed signal Σ in the demodulator 126 (shown by example in FIG. 1A as a subtractor) to reproduce the desired message signal M. The message signal M is then produced at the desired signal receiver 128.

The import of the transmitter 110 and receiver 122 in FIGS. 1A and FIG. 1B is the recognition that the drive signal D, even though it may be chaotic and noise-like, when introduced to the subsystems 116 and 124, will produce an identical and synchronous chaotic signal X. The chaotic signal X is noise-like and is random in time. Nevertheless, since chaotic signal X can be reproduced in synchrony at two different locations, it can be used to encode and decode the message signal M in the respective transmitter 110 and receiver 122. In essence, since signal X is identically produced in both the receiver demixer and transmitter mixer, it can be used to mix and demix the desired signal.

Figure 2:
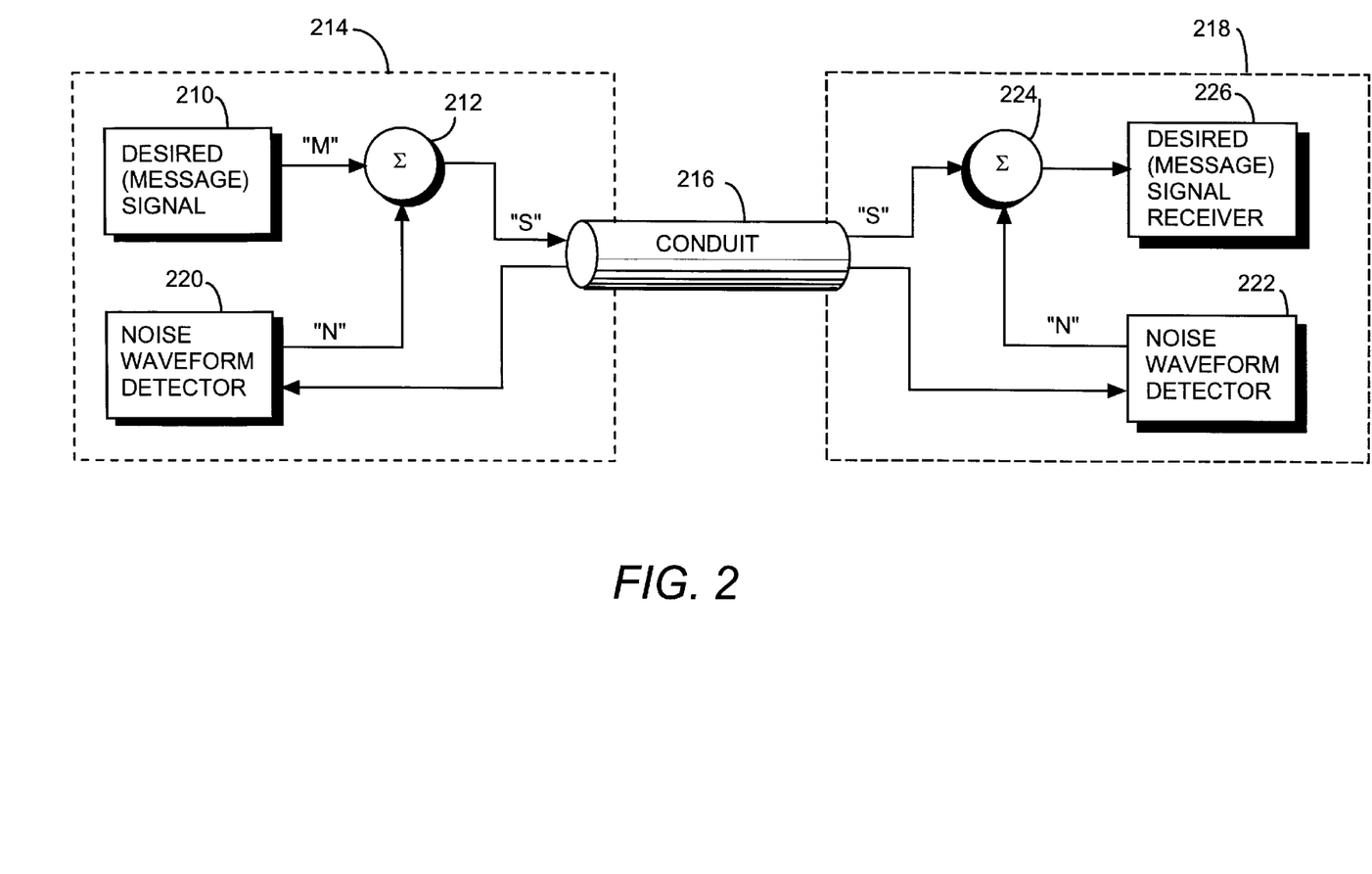
FIG. 2 is a simplified, schematic diagram of an embodiment of the present invention.

FIG. 2 shows an example embodiment of the present invention. In FIG. 2, the desired message signal generator 210 mixes the desired message signal M with the noise signal N in a mixer 212 to obtain a mixed signal S that is transmitted on a conduct 216 from a transmitter 214 to a receiver 218. The noise signal N is obtained by the noise waveform detector 220 as the inherent and self sustaining complex noise frequencies that exist on the conduit 216 in its natural state. The receiver 218 of FIG. 2 also includes a noise waveform detector 222 that detects the same inherent self sustaining noise components N on the conduit that the noise waveform detector 220 of the transmitter 214 detected. Having obtained the identical noise component N from the conduit 216 that the transmitter obtained, the receiver 218 is able to demodulate the desired message signal M from the sum signal S in the mixer 224 and output it to the message receiver 226.

Thus, the transmitter 214 and receiver 218 use a chaotic noise signal to carry an encoded message signal across a conduit 216. In fact, the chaotic noise signal N contains the naturally occurring complex periodic frequencies that occur on the particular non-homogeneous conduits used. When perturbed by a nonlinear source, these complex periodic frequencies can be separated into individual frequency carriers that are themselves supported by the conduit and that are relatively insensitive to any other type of noise occurring on the conductive conduit.

Figure 3:
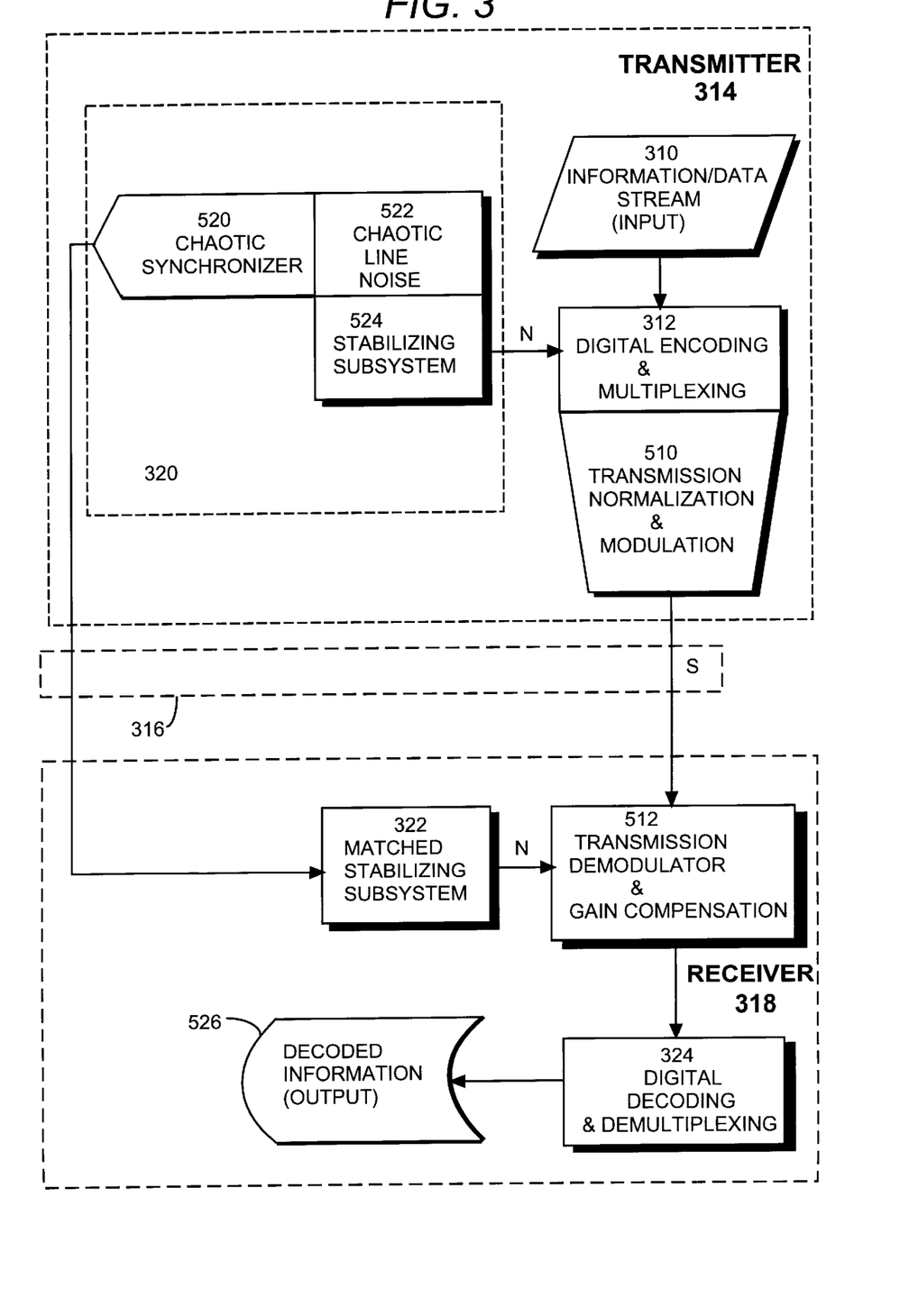
FIG. 3 is a schematic diagram of an example transmitter and receiver according to the present invention.

FIG. 3 shows the present transmitter 314 (corresponding to transmitter 214 in FIG. 2) and receiver 318 (corresponding to receiver 218 in FIG. 2) in greater detail. In the transmitter 314, the message signal generator 310 is shown as the information or data input to the digital encoder 312 when the information data (desired signal) is mixed with the noise component from the noise waveform detector 320. The noise component is obtained by the combination of the chaotic syncrhomizer 520, the chaotic line noise generator 522, and the stabilizing subsystem 524.

The chaotic synchronizer 520 couples the stabilizing subsystem 524 to the transmission medium by traditional transmission coupling methods.

The chaotic line noise 522 is the chaotic noise that exists on the conduit. The noise is used to normalize the signal to the level of the chaotic noise by traditional electrical engineering means. This is described mathematically as $$\frac{\sum_{i=1}^{t}(\Delta Pi - \Delta Pi - 1)}{t} > 1$$

where P is a result of a perturbation introduced into a system at a point in time i over a period of time t.

The active driving signal (chaotic signal generated as an amplified, gain adjusted function of media noise) is supplied in synchronous fashion by transmission concurrently with the information stream, or as a passive interconnection relying on the characteristic residual chaotic noise that exists within the system or on the conduit within the span of time defined as t.

The Stabilizing Subsystem 524 utilizes a Chaotic Noise Code approach by substituting nonlinear components of the line noise for pseudo random noise codes with a signal modulated to then noise used as a carrier. This system is identical to the receiver matched stabilizing subsystem 322. The Chaotic Noise Code Resolution (used by the Stabilizing Subsystem 322 and 524) is described mathematically as:

$$\frac{\sum_{i=1}^{t}(\Delta Pi - \Delta Pi - 1)}{t} < 1$$

where P is a result of a perturbation introduced into a system at a point in time i over a period of time t.

The noise signal from the noise waveform detector 320 is then mixed with the information from the desired signal generator 310 in the encoder 312. The mixed signal is then normalized and nonlinearly modulated in the output device 510. This brings the digital information onto the frequency modulated carrier by any of a plurality of means known by those skilled in the art of digital transmission. The mixed signal is then passed onto the conduit 316.

The conduit 316 can be a conductive or non-conductive medium. The noise waveform detector 320 also provides a synch signal to drive the stabilizing subsystem 322 (like the stabilizing subsystem 524) to the receiver 318. The transmitter 314 thus provides the receiver 318 with both the mixed signal from the output device 510 and a chaotic drive signal.

The receiver 318 accepts the mixed signal from the output device 510 at a demodulator and gain compensator, which is a standard input device for a receiver. In response to the drive signal from transmitter 314, the matched stabilizing subsystem 322, creates a chaotic signal identical to and in synchronous with the chaotic signal generated by the stabilizing subsystem 524 of the transmitter 314.

The receiver 318 decoders the desired signal by removing the noise component generated by the matched stabilizing subsystem 322 from the mixed signal S in the digital decoder 324. The desired signal is then output to the receiver output device 526.

The noise component N that is produced by the stabilizing subsystem 524 and the matched stabilizing subsystem 322 in the transmitter and receiver, respectively, is a chaotic signal that is not necessarily explicity identified in time by either the transmitter 314 or the receiver 318. The identification of this signal would be extremely difficult and is not necessary since, although the signal is chaotic and effectively random, it is synchronously resolved in both the stabilizing subsystem 524 and the matched stabilizing subsystem 322, thereby allowing it to be used for the encoding and decoding processes.

The algorithms used by the noise waveform detector 320 to detect the sustainable noise component on the conduit and to index the available frequency bands are describe din greater detail below. The algorithms are described, for simplicity, in well-known pseudo-code format.

The overall purpose of the first algorithm is to effectively calculate what is commonly referred to as the chaotic "attractor" for the noise component:

ALGORITHM 1

```
1.  CALCULATE ATTRACTOR FOR CONDUIT
2.     bits/second required = F (data rate, bit error rate)
3.     chips/bit required = F (noise immunity, spreading factor)
4.     DEFINE CHAOTIC NOISE CODE VALUES
5.        n = 0; # of chaotic noise codes defined
6.        until S/N> = S/N_MIN & n> = (bits/second required *chips/bit required) do
7.           until [(signal/noise)' = 0 & (signal/noise)''' = 1] or time out expiration do
8.              sweep aggregate frequency band
9.              F_chaotic (codeprev) >> new code
10.             if S/N_new code > = S/N_prev code
11.                n = n + 1
12.                Chaotic Noise Code_n = new code
                end if
             end until
          end until
```

-continued

13. AttractorWaveform$_{complex}$ = $\Sigma$[Cn F$_{recurse}$ ($\sqrt{(-Cn)}$)]

the above pseudo-code is described below with references to the line numbers indicated.

In line 1, the overall goal of the algorithm is described as calculating the attractor for the particular conduit being used. This means attempting to define the noise structure (i.e., effective chaotic signal attractor) for the purposes of nonlinear signal modulation.

At line 2, the bits per second variable is defined as a function of the required data rate and bit error rate.

At line 3, the chips per bit variable is defined as a function of degree of external noise immunity (from none to highest, a relative variable), and the spreading factor as it is defined from the spectral density profile and software defined transmission parameters.

Line 4 is a header that describes the following steps as attempting to define the chaotic noise code values for the particular conduit and the particular parameters required in the definition steps 2 and 3 above. The chaotic noise code values will be used in the final step (13) to determine the waveforms that will allow the existing noise to be used as an information carrier.

At step 5, the noise code value is initiatized at 0. As will be seen in the coming steps, the characteristics of the noise component at the current noise code value will be analyzed for a sustainable noise structure. Then, at step 12 in the algorithm, the noise code value will be incremented to a new noise code index number and the analysis will be repeated.

Line 6 is the beginning of a loop to determine if the signal-to-noise ratio of the current noise code value is above a specified minimum. The specified minimum is determined in a particular application by the requirements dictated by the modulation parameters. Also at line 6, the number of available and useful chaotic noise codes so far determined is added to identify whether the throughput required can be met by the available noise codes.

At line 7, the local and global nodes of the noise profile as a function of signal to noise ratios are found. This tests for a peak signal-to-noise ratio and a global maximum signal-to-noise ratio within a specified band.

At line 8, an aggregate frequency band is sampled to identify the chaotic noise codes as defined in lines 9–12.

At line 9, the chaotic derivatives of the subsampled noise profile is temporarily stored as the new code. The determination of F$_{CHAOTIC}$ is described in greater detail below.

At line 10, the noise profile is tested to determine if it yields a viable carrier (as a functions of its effective ability to carry the information with the required external noise immunity).

At line 11, the carrier channel number is incremented.

At line 12, the nonlinear chaotic noise code to be used for calculating the overall noise structure of line 13 is stored.

At line 13, the overall noise sustained structure to be used as the carriers for the information is calculated as a recursive sum of the vectors' dot products in their real and imaginary planes. This statement takes into account the electromagnetic properties for wave guide purposes, as well as the noise profile for signal modulation requirements. $C_n$ is the carrier noise code for value n. The calculation of F$_{recourse}$ is described in greater detail below.

CALCULATING F$_{CHAOTIC}$

Analogous to Floquet Theory (often referred to as Bloch Theory by physicists) for proof of linear stability for periodic solutions, there exist equilibrium points as well as subharmonic period doubling and other types of bifurcation points that together form the chaotic attractor of a nonlinear system. This chaotic attractor can be used as an information transport when perturbed by an external energy source.

This perturbation is the source of separable solutions of noise codes, and the stability and local periodicities of the noise sustained structure are the result of the equilibrium and bifurcation points being bounded within a finite phase space of its limit cycles as defined in the Poincaré-Bendixson Theorem (reference pg. 187 Non Linear Systems, Artech House, 1980).

Beginning with dx/dt=F(x), we wish to find a solution of X of period T such that X(T+0=X(0, $\forall$t implying that X is representative of a closed curve in its local phase space. This is a stable solution for a carrier by virtue of the fact that the equilibrium point is at least a metastable, though not necessarily a globally stable Lyapunov trajectory. For small perturbations of $X_o$–X, the limit cycle of the closed phase space, which represents its local attractor, is bounded by: x=$\sqrt{a}$ cos(t+$\theta_o$), y=$\sqrt{a}$ sin (t+$\theta_0$) at its locally defined origin in a two dimensional infinite phase plane for amplitudes a >0 as indicated by the Poincaré-Bendixson Theorem. F$_{CHAOTIC}$ can then be found by introducing a nonlinear perturbation of the form dx/dt=F(x,y)+ax-cy and dy/dt=G(x,y)+ay+xc where a<0 and F & G are continuously differentiable functions satisfying $[f(x,y)]^2+[G(x,y)]^2=O[(x^2+y^2)^2]=$ F$_{CHAOTIC}$as x→0. [Equation 1.] This perturbation is the source of separable solutions of noise codes, and the stability and local periodicities of the noise sustained structure are the result of the equilibrium and bifurcation points being bounded within a finite phase space of its limit cycles as defined the Poincaré-Bendixson Theorem.

CALCULATING F$_{RECURSE}$

To calculate F$_{RECURSE}$, we begin with a canonical equation for oscillations of a conservative system satisfying:

$$\frac{d^2\chi}{dt^2} + \chi = \varepsilon f(\chi)$$

where F satisfies [Equation 1] of F$_{chaotic}$ and F(0)=F'(0)=0, and $\epsilon$ is a parameter where $\epsilon$=0 1) implies simple harmonic motion with period 2$\pi$ independent of the amplitude of the oscillation, and 2) when $\epsilon$ is small there are periodic solutions with period dependency on amplitude (a) and parameter ($\epsilon$) such that:

X (t,$\epsilon$)=a Cos($\epsilon$) tCos(t)—a Sin($\epsilon$) t Sin(t) for the explicity exact solution of the simple harmonic when perturbed by an external energy source.

This yields the simplified approximation for the differential equation for the bounded system as:

$$x(t,\epsilon)=aCos\omega\ t+\tfrac{1}{32}\epsilon\ a^3(Cos\omega t-Cos3\omega t)+O(\epsilon^2 a^5)$$

where $$\omega = 1\tfrac{3}{8}ea^2 + O(\epsilon^2 a^4) \text{ for small } \epsilon \to 0.$$

which by use of Lagrange's identity:

$$\int_0^{2\pi}(uLv - vLu)dt = \left(\left[u\frac{dv}{dt} - v\frac{du}{dt}\right]\right)_0^{2\pi} \text{ becomes:}$$

$$\frac{1}{2}\left(2\omega_1 a + \frac{3}{4}a^3\right) = 0$$

which is the limit cycle of the chaotic attractor. This then gives rise to a set of closed curves in phase space that define all possible points in space within which a signal may be expected to be bounded. These are the only convergence points that are useful for information transport within this autonomous two dimensional system, since these nonlinear bifurcations uniquely yield real period solutions satisfying:

$$\omega(a) = 1 + 10/3\ a + O(a) \text{ as a } \uparrow 0$$

where a <0 an d2π/ω is the limit cycle (attractor) which together determine the global pattern of the phase space orbits with information carriers defined by $$x = \sum_{n=1}^{N} A_N \cos\omega t \cos\frac{\pi}{N} = F_{recurse}$$

and their velocities of propagation defined as:

$$\langle v_\beta \rangle = \frac{2(\beta+2)}{(\beta+4)(\beta+1)^{\frac{1}{2}}} v_0 \frac{\langle E^{\beta/2+1}\rangle}{\langle E^{\beta/2}\rangle} \sim E_0^{-\beta/2}$$

where $v_\beta$ is a local instantaneous velocity of propagation that is a function of spatial and temporal coordinates allowing information to be transmitted by using the velocity solution to synchronize the subsystems so that the information (i.e., the perturbation) can be identified as a field distortion which is a function of time and amplitude.

As is the case in a linear system, the ratio of ω/k (the ratio of the frequency to the wave number) as it applies to the phase velocity and the dispersion relation, shows that by varying the amplitude (rather than the source frequency) one can modulate the wave number in an exact manner rather than via a truncation of an expansion. The information carrying field of the nonlinear medium thus oscillates in space time with linear control possible as is denoted by:

$$\omega/k = E_0^{-\beta/2}\sqrt{\beta+1}\ v_0 B\left(\frac{1}{\beta+2}, \frac{1}{2}\right) / B\left(\frac{\beta+1}{\beta+2}, \frac{1}{2}\right)$$

(ref. pg 10 Nonlinear Material Science, Explicitly Exact Solutions in a Family of Nonlinear Media).
wherein $\omega_c$ is a critical frequency that follows the relationship $\omega_c = k_c v - \tfrac{2}{3}k$ for the critical wave numbers as defined by satisfying the previously established equilibrium points of $F_{chaotic}$ and the Unstable Nonlinear Schrödinger equation which governs the behavior of virtually all weakly nonlinear wavepackets including waveguides, solutions, and plasmas (ref. Drazin, P. G. & Johnson, R. S., 1989 Solitons: an Introduction, Cambridge University Press.)

Algorithm 2 describes the steps for separating out the carrier frequencies when nonlinear code division is used. Since the carrier frequencies are often functions of each other and themselves, they can be separated when noise is introduced to the system, rather than through externally defined carrier noise codes. This is described mathematically (in pseudo code) as:

ALGORITHM 2

1. Allocate bandwidth for channel switching scheme
2. define/identify frequency bands
3. index bands
4. define indexed bands as an aggregate bandwidth pool
5. Allocate bandwidth as a function of data throughput
6. upsample to increase Bandwidth per Connection downsample to increase Connections per Bandwidth
7. Until Bandwidth Connection$_{required}$>Bandwidth Remaining do
8. Waveform Signal=Attractor Waveform$_{complex}$; defined in algorithm 1
9. end until Line 1, defines the algorithm as an overall frequency pooling for bandwidth allocation scheme.

In step 2, the frequency bands are defined. This takes into account software defined parameters that may dictate that certain bands (due to licensing or other restraints) be avoided.

At step 3, the beginning and ending points of the segments in an absolute (e.g. Hz) sense are determined.

At step 4, the boundaries for the individual frequency segments available are stored.

Line 5 describes the purpose of steps 6 & 7. Depending on the required transmission rate, the bandwidth is allocated by performing either step 6 or step 7.

At step 6, bandwidth is increased to optimize for the individual connection rate.

At step 7, the connections are increased to optimize for more concurrent users.

At step 8, a test is made to determine if the system is fully loaded to perform step (9).

At step 9, the information is modulated onto the noise structure defined in algorithm 1 (steps 1–13).

Figure 4:
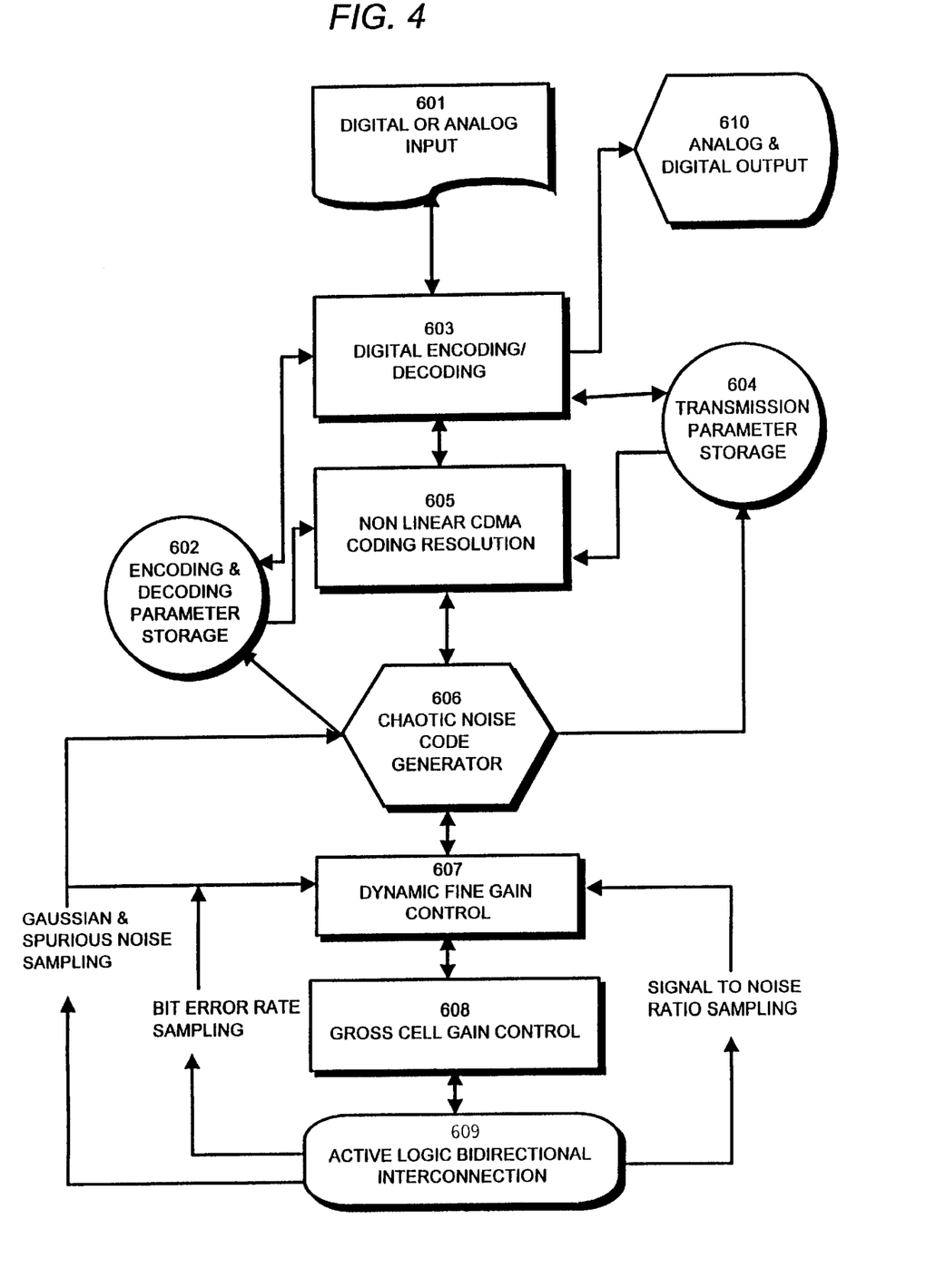
FIG. 4 is a flowchart illustrating a method of transmitting and receiving according to an example embodiment of the present invention.

The operation of the transmitter of FIG. 3 is shown in FIG. 4 and described below.

At step 601, a Digital or Analog Input is received at the input 310 of the transmitter 314.

At step 602, parameters for the encoder 312 and decoder 324 are stored. The parameters that are stored include: input format, output format, internal throughput information, embedded functions. The information stored effectively decouples the transmission from the information encoding by allowing the information to be treated as a digital stream that is only dependent on format information at the time of decoding. This allows the system to support any compression/encoding format in a modular fashion.

At step 603, the data is encoded at encoder 312 (for the transmitter 314) or decoded at the decoder 324 (for the receiver 318). The digital encoding converts analog signals into a digital information stream in any predetermined format (e.g. MPEG, DVI, ASCII, etc.) The decoding converts the digital information stream into a discrete analog form for output, buffering, or storage; via the application of a decoding/decompression method.

The system is CODEC and format independent to facilitate the implementation of any standard in modular fashion, via the decoupling of various aspects from the transmission method. A very high dynamic range broadband transceiver (similar in nature to the devices described in U.S. Pat. Nos. 4,230,956 and 4,112,374 to Steinbrecher) allows the entire software definable frequency band to be down-converted and digitized. Once in a digital format the information can be treated independently of its original transmission methodology (TDMA, CDMA, analog, etc.) using software driven digital signal processors.

At step 604, Transmission Parameter Storage: The transmission parameters set the boundary conditions for the nonlinear CDMA systems and decouples the rest of the present invention from the transmission methodology and conduits. The parameters that are stored include: bandwidth information (required, available, etc.); transmission characteristics (line crosstalk, frequency limits, existing spectrum profile, desired spectral density; and dynamic throughput information).

At step 605, non linear CDMA coding: The CDMA coding is done in a non sequential, non linear fashion from a pool of dynamic complex frequencies that represent the transmission medium's chaotic noise characteristics combined with an encoding address template that is required for decoding of the signal. This allows multiple signals reaching the receiver to be combined constructively rather than treating them as multipath interference.

At step 606, Chaotic Noise Carrier Code Generator: The generation of Chaotic Noise Carrier Codes (CNC codes) requires dynamic sampling of the transmission conduit's ambient and spurious noise spectrum in order to optimize the carrier and modulation frequencies' spectral density for the required signal to noise ratio as well as avoiding interference with other concurrent traffic such as analog or digital transmissions of data, voice, or visual information.

At step 607, Dynamic Fine Gain Control: Digital signal processors are employed to calculate the value of the gain (positive or negative) to be applied to a received signal to maintain a signal to noise ratio high enough to yield an error rate that is a ratio of the required throughput to a stochastic function of the dynamic noise sampling frequency as dictated by available DSP technology and required throughput. The fine gain control also increases the resolution of the chaotic attractor for the specific connection and also constructively affects the noise sustained structure for the rest of the locally affected area.

At step 608, Gross Cell Gain Control: The transceiver's AGC (automatic gain control) adjusts the gain of the received signal to keep it in parity with the dynamic power level received at the remote transceiver or base station. The combined effect of the regulation of all of the transceivers' power levels within the cell has two important effects: 1) It maintains the effective size of the cell to be the minimum necessary to support the communications network, thereby minimizing the power requirements of both base stations and remote transceivers; and 2) it imposes a signature on the local area which has the effect of increasing the effective resolution of the chaotic attractor within the noise spectrum, which decreases the required output power of all transmission sources in that effective logical network. Each fixed base station or mobile transceiver contributes to the network as both an active power regulation component of the cell and as a passive bridge transparently supporting other traffic without incurring data or address overhead.

At step 609, Active Logic Bi-directional Interconnection: The active logic interconnections are hardware and software interfaces that are specifically designed for the particular conduit (e.g. powerline, twisted pair, ethernet cabling, wireless, etc.) They have several functions 1) physical coupling (impedance matching, timing signal calculation and generation, etc.); 2) storage of software enabled distributed functionality that can be accessed remotely (decoding keys, logical/physical address updating, etc.); 3) simulating or directly supporting analog switching and digital routing of the network information (e.g. bit error rate, S/N ratio, ambient noise, etc.) In contrast to the systems it interfaces with, much of the need for active regulation of the transmission conduit is avoided by identifying and using the existing noise sustained structure for transmission coding. This negates the need to directly filter, amplify, or change the spectral density profile of the signal.

At step 610, Analog & Digital Output: the resolved transmission of (1) Input.

This example embodiment of the invention thus provides a conductive or dielectric conduit used as a waveform guide to constrain a wireless signal. The signal is dynamically and intelligently adjusted to take best advantage of the medium upon which it is being transmitted, and to use the inherent noise, power levels, available bandwidth and concurrent traffic to adjust that signal for optimum transmission quality. This results in a broad range of spectral density profiles that will support the desired signal.

BANDWIDTH INDEXING

Figure 5:
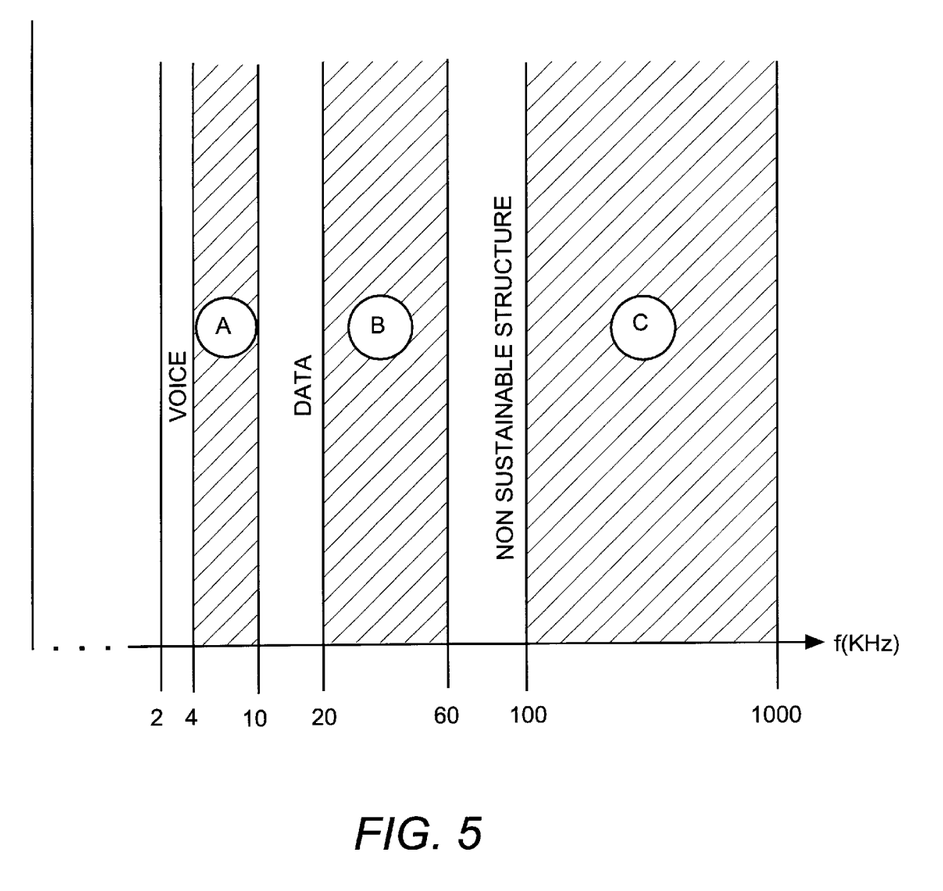
FIG. 5 is an example available bandwidth diagram.

The bandwidth indexing scheme is based on two criteria:

1. Bandwidth is allocated as a pool of available frequencies. FIG. 5 generally illustrates an example of the bandwidth indexing scheme of the present invention. In FIG. 5, the available frequencies are shown in a kHz range on the X-axis. Near the left of FIG. 5, a voice band is illustrated between 2 kHz and 4 kHz. Above that, a useable frequency band of between 4 kHz and 10 kHz is illustrated as Band A. Thereafter, a band from 10 kHz to 20 kHz is dedicated to data use; a band from 20 kHz to 60 kHz is available as useable Band B; a band from 60 kHz to 100 kHz is identified as containing non-sustainable noise; and a band from 70 kHz to 100 kHz is identified as a useable Band C. The present invention scrolls through available channels to identify the useable Bands A, B and C; the dedicated bands ("voice" and "data"); and the non-useable bands ("non-sustainable noise") in the spectrum shown in FIG. 5. These determinations are made through either external inputs (i.e., as in the case of dedicated voice and data lines) or by testing the frequency bands for the presence of sustainable noise components (i.e., as in the non-sustainable) noise band of FIG. 5).

Once the useable bands A, B and C are identified by the present invention, the useable bands are pooled into a composite effective useable bandwidth of XHz. This is accomplished in the software of the present invention by identifying the bands A, B and C, mapping those bands, and transmitting data packets across the useable bands. The frequency pool is indexed as sets of beginning and ending frequencies and the map of the pool is made available to any node on the network as a packet that can be requested.

2. The bands to be used are software selectable as to the minimum and maximum power allowable within each band in a continuous or discrete manner.

An object of the invention is that the power output can be restrained to milliwatts at any given frequency from 1 KHz to 1 GHz. Available bandwidth increases with frequency as signal duration decreases. In a typical system this would be compensated for with an increase in transmission power. In the invention this is not the case, since the underlying noise of the transmission signal is used to sustain the signal by acting as a nonlinear waveform guide.

The spectral density profile is software/firmware definable in frequency band, power level and roll off/attenuation. This provides a large degree of latitude in modifying signal transmission characteristics to reflect the dynamic needs of the transmission conduit (air, powerline, twisted-pair, etc.) and other constraints.

An example embodiment of the present invention uses wave division multiple access, which is the basic method used in any frequency selectable broadcast or communication channel (e.g. radio or television), to identify or utilize available frequency bands.

ISOCHRONOUS TRANSMISSION

The above apparatus and method can provide and maintain an isochronous transmission stream. One exemplary method which may be employed to maintain an isochronous transmission stream provides data packet transmission, with each packet including a header containing:

a) the required bit rate at the present packet size;

b) the packet destination address; and c) padding to be used for error detection and correction bits.

This method allows for dynamic upshifts and downshifts in the bandwidth allocation without prior knowledge of the throughput for the information stream. This allows an isochronous session to be maintained within a synchronous session. The error detection scheme is independent of the transmission, since the padding results in bits that can be stripped on either the sending or receiving end as needed to allow for a range of error detection from none (and no padding) to hardware level total error checking.

Before error correction, the nonlinear encoded digital information is capable of bit error rates exceeding $10^{-5}$.

Another exemplary method which may be employed to maintain an isochronous transmission stream requires that there may be sent:

at the beginning of the transmission:

a) the bit rate required for the at present mean throughput b) destination address for the information stream c) transmission protocols (error detection, handshaking) allowing isochronous sessions to be maintained in a synchronous fashion; and during the transmission:

a) changes required bit rate required for the at the present throughput based on bit error rates and signal to noise ratio b) changes in communications protocols (error detection, etc.

This method allows for an isochronous connection to be maintained within an asynchronous link.

In one embodiment of the present invention, the data is not modulated onto the noise signal directly but rather bits are split into redundant sets of themselves and sent as individually carried streams similar to a code division multi-access scheme. The major macroscopic difference between the present scheme and the code division multi-access scheme is the carrier frequencies in the present case are naturally occurring periodic perturbations induced by nonlinear electromagnetic stimulation resulting in subharmonic bifurcations with long range phase coherence.

Figure 6:
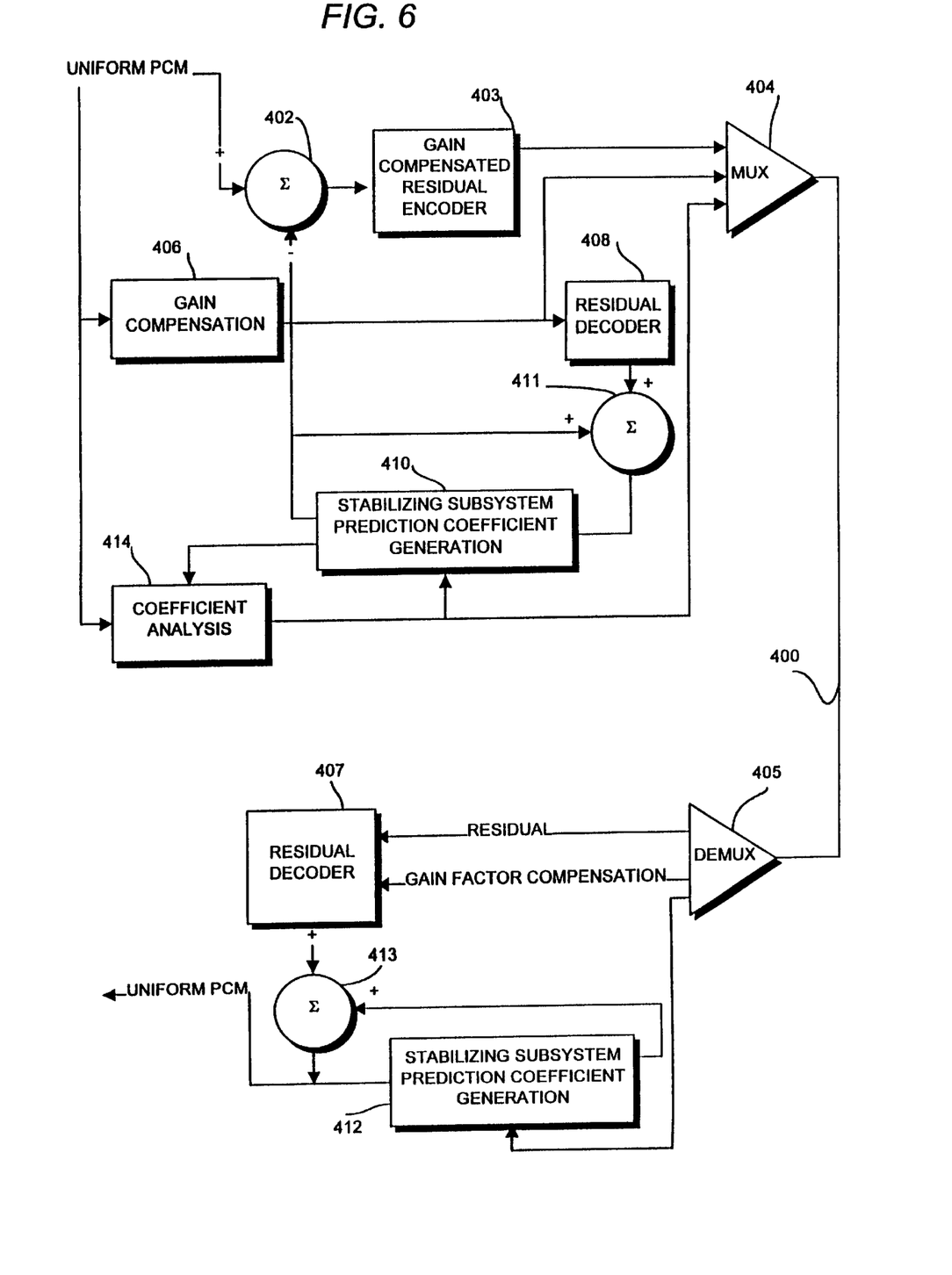
FIG. 6 is a schematic diagram of an example embodiment of the present invention.

FIG. 6 illustrates an application of the present invention. Specifically, FIG. 6 shows a transmitter and a receiver coupled by the conduit 400 in which a uniform pulse code modulation (PCM) signal is modulated onto a chaotic noise signal in the transmitter and demodulated from the chaotic noise signal in the receiver. The aspects of the present invention relating to the prediction of the noise waveform on the conduit 400 is performed in the matched stabilizing subsystems 410 and 412. In the manner previously discussed, the matched stabilizing subsystems 410 and 412 produce synchronized chaotic signals that are modulated with the uniform PCM signal in the modulator 402 and demodulated from the combined signal in the demodulator 413.

The mux 404 is the output for the transmitter onto the conduit 400. It transmits at least three signals: 1) the result of the modulation of the uniform PCM signal and the output of the stabilizing subsystem 410 in the modulator 403, after its encoding by the residual encoder 403; 2) the gained compensation factor from the gain compensation circuit 406; and 3) the synch signal from the coefficient analyzer 414 that will drive both the stabilizing subsystems 410 and the stabilizing subsystem 412 to produce matched synchronized noise component signals. These three signals are transmitted across the conduit 400 to the demux 405 in the receiver.

From there, the modulated PCM signal ("residual") is decoded in the decoder 407 and input to the demodulator 413. The gain compensation signal is also output from the demux 405 to the decoder 407 to adjust for any gain disparity. Finally, the drive signal from the coefficient analyzer 414 is applied to the stabilizer subsystem 412 to produce the identical output as that produced by the stabilizing subsystem 410 and input to the demodulator 413. The output of the stabilizing subsystem 412 is then demodulated from the modulated signal, which has been decoded in the residual decoder 407, to reproduce the uniform PCM signal.

While the present invention can be applied to any communications infrastructure, the goal of the invention is to be ultimately applied as a discrete isochronous narrowcast with any-to-any functionality wireless system; or a logical improvement over existing analog and digital cellular systems. The intelligent/adaptive use of power provided by the present invention provides the capability to generate overlapping cells of any radius.

Figure 7:
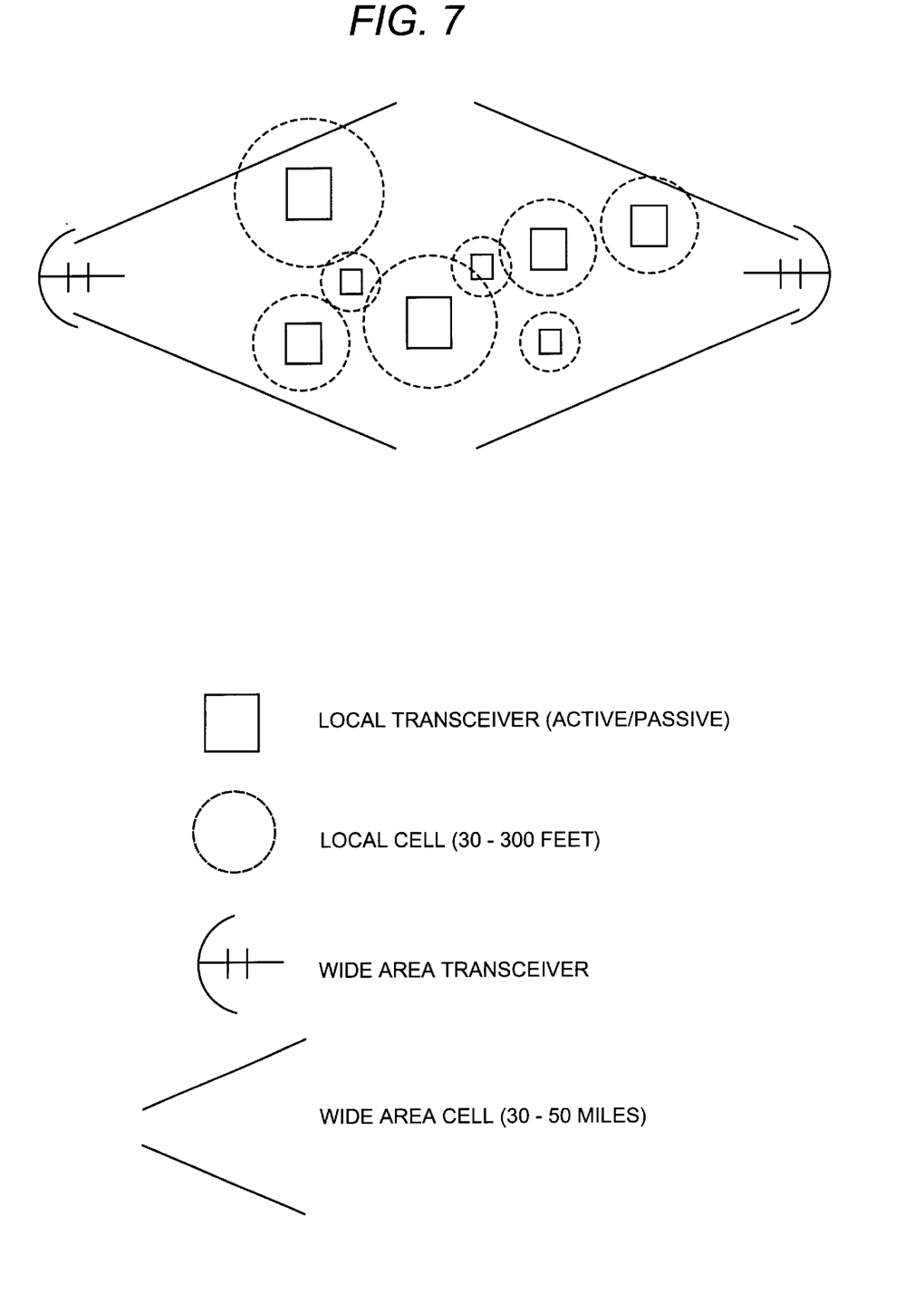
FIG. 7 is a diagram showing an application of the present invention in a wireless environment.

The average metropolitan area, for example, could be covered by two Wide Area Transceivers with overlapping cones of transmission. This is shown, by way of example, in FIG. 7. Local Transceivers within these areas would have a cell radius that is intelligently and dynamically adjusted based on communications needs such as bandwidth requirements, density of other cells, power levels, etc. Local transceivers outside the range of other local cells could tie into the Wide Area Transceiver to communicate with other local transceivers. As the density of cells increased, the need for Wide Area Transceivers would be reduced, as would the power requirements of the local cells. All Transceivers are both active and passive, in that they provide a routing pass through communications function even when not in use by the operator. This effectively distributes the switching and intelligence of the network to every local transceiver in a model similar to the emerging distributed peer-to-peer computer network.

The foregoing description of the preferred embodiments has been presented for purposes of illustration and description. It is not intended to be exhaustive nor to limit the invention to the precise form disclosed, and many modifications and variations are possible in light of the above teaching. It is intended that the scope of the invention by defined by the claims and their equivalents.

What is claimed is:

1. A communication system for use with a communication conduit, comprising:
   a transmitter, comprising:
      an input coupler in electrical communication with the conduit,
      a signal source providing an information signal,
      an encoder, in electrical communication with the input coupler and the signal source,
      a first subsystem, in electrical communication with the conduit and the encoder, to derive, using a predetermined mathematical algorithm, separable solutions of noise codes obtained by perturbation of the phase space bounding the inherent nonlinear chaotic noise on the conduit and output the noise codes to the encoder,
      whereby the encoder combines the information signal and the noise codes and outputs the combined signal to the input coupler, and whereby the input coupler provides the combined signal to the conduit; and
   a receiver comprising:
      an output coupler, in electrical communication with the conduit to receive the combined signal from the transmitter,
      a second subsystem, in electrical communication with the conduit, the second subsystem being matched to derive, independently of the first subsystem and using the same predetermined algorithm, the noise codes on the conduit,
      a decoder, in electrical communication with the second subsystem and the output coupler, to separate the noise codes from the combined signal and generally yield the information signal.

2. A communication system according to claim 1, wherein the conduit is a conductive wire.

3. A communication system according to claim 1, wherein the conduit is air.

4. A communication system according to claim 1, wherein a portion of the conduit is air and another portion of the conduit is conductive wire.

5. A communication system according to claim 1, wherein:
   the chaotic noise components are characterized at any instant by a chaotic attractor,
   the first and second subsystems use the same predetermined algorithm to independently approximate the chaotic attractor, and
   the encoder and decoder respectively combine and separate the information signal and the approximated chaotic attractor.

6. A method of transmitting and receiving information data on a conduit, comprising continuously repeating the steps of:
   1) dividing the information into discrete chips;
   2) deriving noise codes to describe nonlinear chaotic noise at one end of the conduit;
   3) modulating the discrete chips onto the noise codes of step 2) to obtain a modulated chaotic signal;
   4) inputting the modulated chaotic signal onto the conduit;
   5) repeating 2) at the other end of the conduit;
   6) receiving the modulated chaotic signal from the conduit; and
   7) demodulating the noise codes of step 5) from the modulated chaotic signal to obtain the discrete chips.

7. A communication system for communicating an information signal through a space having noise characterized at any instant by a chaotic attractor comprising:
   a transmitter to approximate the chaotic attractor for the noise using a predetermined algorithm by perturbation of the phase space bounding the noise, to combine the chaotic attractor with the information signal, and to transmit the combined signal into the space; and
   a receiver, in electrical communication with the transmitter via the space, to also approximate the chaotic attractor for the noise using the same predetermined algorithm by perturbation of the phase space bounding the noise, to receive the combined signal, and to separate the information signal from the combined signal using the chaotic attractor approximately by the receiver.

8. A communication system according to claim 7, wherein at least a portion of the space is air.

9. A communication system according to claim 7, wherein at least a portion of the space is a waveguide.

10. A communication system according to claim 7, wherein at least a portion of the space is one from a group consisting of:
    a dielectric; and
    a nonconductive material.

11. A communication system according to claim 7, wherein at least a portion of the space is a conductive material.

12. A transmitter for applying a desired message to a channel comprising:
    a carrier generator to derive a probability that a given bounded condition corresponding to a self-sustaining noise component will exist on the channel when the desired message is applied, derived by perturbation of the phase space bounding the noise component on the channel, and;
    a mixer to modulate the desired message based on the given bounded condition.

13. A transmitter according to claim 12, wherein the transmitter derives the probability that the given bounded condition will exist at a particular time and then applies the desired message to the channel at the particular time.

14. A transmitter according to claim 12, wherein the transmitter continually applies different desired messages over time, continually derives probabilities that given bounded conditions will exist on the channel over the times when the desired messages are applied, and continually updates the modulation of the desired messages based on the derived probabilities over time.

15. A transmitter according to claim 12, wherein the transmitter modulates the desired message based on chaotic noise codes corresponding to the given bounded condition.

16. A transmitter according to claim 14, wherein the transmitter updates the modulation of the desired messages over time based on chaotic noise codes corresponding to the given bounded conditions over time.

17. A transmitter according to claim 12, wherein at least a portion of the channel is a conductive material.

18. A transmitter according to claim 12, wherein at least a portion of the channel is a waveguide.

19. A transmitter according to claim 12, wherein at least a portion of the channel is one from a group consisting of:
    a dielectric; and
    a nonconductive material.

20. A transmitter according to claim 18, wherein at least a portion of the channel is air.

21. A transmitter according to claim 12, wherein the probability that the bounded condition will exist on the channel is determined by measuring naturally occurring and self-sustaining chaotic noise structures present on the channel over time.

22. A transmitter according to claim 21, wherein the transmitter derives the probability that the bounded condition will exist on the channel by deriving chaotic attractor values for the chaotic noise structures.

23. A transmitter and receiver communicating over a common channel, each independently deriving a probability that a bounded condition corresponding to a self-sustaining noise component on the channel will exist on the channel at a given time, wherein:
the transmitter includes a modulator to modulate a desired message onto the channel at the given time based on the probable bounded condition independently derived by the transmitter to exist on the channel at the given time obtained by perturbation of the phase space bounding the self-sustaining noise component on the channel, and
the receiver includes a demodulator to demodulate the desired message from the channel based on the probable bounded condition independently derived by the receiver to exist on the channel at the given time also obtained by perturbation of the phase space bounding the self-sustaining noise component on the channel.

24. A transmitter and receiver to claim 23, wherein the desired message is a discrete portion of a larger message.

25. A transmitter and receiver according to claim 23, wherein the transmitter applies the desired message to the channel at the given time.

26. A transmitter and receiver according to claim 23, wherein the transmitter continually applies different desired messages over time, continually derives probabilities that given bounded conditions will exist on the channel when the desired messages are applied, and continually updates the modulation of the desired messages based on the derived probabilities over time.

27. A transmitter and receiver according to claim 23, wherein the transmitter modulates the desired message based on chaotic noise codes corresponding to the probable bounded condition.

28. A transmitter and receiver according to claim 26, wherein the transmitter updates the modulation of the desired messages over time based on chaotic noise codes corresponding to the probable bounded conditions over time.

29. A transmitter and receiver according to claim 23, wherein at least a portion of the channel is a conductive material.

30. A transmitter and receiver according to claim 23, wherein at least a portion of the channel is a waveguide.

31. A transmitter and receiver according to claim 23, wherein at least a portion of the channel is one from a group consisting of:
a dielectric; and
a nonconductive material.

32. A transmitter and receiver according to claim 23, wherein at least a portion of the channel is air.

33. A transmitter and receiver according to claim 23, wherein the probability that the bounded condition and receiver will exist on the channel is derived by measuring naturally occurring and self-sustaining chaotic noise structures present on the channel over time.

34. A transmitter and receiver according to claim 33, wherein the transmitter and receiver derive the probability that the bounded condition will exist on the channel by deriving chaotic attractor values for the chaotic noise structures.

35. A receiver for use with a transmitter communicating with the receiver over a common channel and providing a desired signal onto the channel using a modulation method derived by a probability that a bounded condition corresponding to a self-sustaining noise component on the channel will exist on the channel at a given time, wherein:
the receiver includes a demodulator to demodulate the desired message from the channel based on a probable bounded condition independently derived by the receiver to exist on the channel at the same given time, said condition derived by perturbation of the phase space bounding the self-sustaining noise component on the channel.

36. A receiver according to claim 35, wherein the desired message is a discrete portion of a larger message.

37. A receiver according to claim 35, wherein the receiver receives the desired message from the channel at approximately the given time.

38. A receiver according to claim 35, wherein the receiver continually receives different desired messages over time, continually derives probabilities that given bounded conditions will exist on the channel over the times when the desired messages are received, and continually updates the de-modulation of the desired messages based on the derived probabilities over time.

39. A receiver according to claim 35, wherein the receiver de-modulates the desired message based on chaotic noise codes corresponding to the probable bounded condition.

40. A receiver according to claims 39, wherein the receiver updates the de-modulation of the desired messages over time based on chaotic noise codes corresponding to the probable bounded conditions over time.

41. A receiver according to claim 35, wherein at least a portion of the channel is a conductive material.

42. A receiver according to claim 35, wherein at least portion of the channel is a waveguide.

43. A receiver according to claim 35, wherein at least portion of the channel is one from a group consisting of:
a dielectric; and
a nonconductive material.

44. A receiver according to claim 35, wherein at least a portion of the channel is air.

45. A method of communicating a message along a conduit having naturally occurring and self-sustaining noise components inherently thereon, the method comprising:
independently anticipating at both input and output ends of the conduit a probable noise component at a particular instant by perturbing the phase space bounding the noise component on the conduit;
encoding and retrieving the message on the conduit with a carrier derived from the independently anticipated probable noise components.

46. A method of communicating according to claim 45, further including the step of measuring the noise components inherently on the conduit as dynamic sets of complex frequencies.

47. A method of communicating according to claim 45, further including the step of deriving the noise components as chaotic attractors formed by the limit cycles of bounded conditions in phase space.

48. A method of communicating according to claim 45, further comprising the step of deriving the noise components as harmonic oscillators having associated quantitative probabilistic states for use in mixing with the message.

49. A system for communicating signals over a channel, comprising:

means for resolving inherent interference existing on the channel by means of a chaotic attractor by deriving separable solutions of interference obtaining by perturbation of a phase space bounding the interference on the channel; and means for encoding the signals to be communicated based on the chaotic attractor.

50. A system according to claim 49, wherein the interference is noise.

51. A system according to claim 49, wherein:

the means for resolving inherent interference resolves the interference by means of a plurality of chaotic attractors, and the means for encoding the signals encodes based on the plurality of chaotic attractors.

52. A system according to claim 49, further including:

a transmission end and a receiving end, each of which includes said means for resolving inherent interference on the channel by means of a chaotic attractor, and said means for resolving at said transmission end synchronizes the chaotic attractor with the means for resolving at said receiving end.

53. A system according to claim 52, wherein the means for resolving inherent interference resolves the interference by means of a plurality of chaotic attractors synchronized to each other, and the means for encoding the signals encodes based on the plurality of chaotic attractors.

54. A system according to claim 49, wherein at least a portion of the channel is one chosen from a group consisting of:

a waveguide air, a waveform, a conductive material, and a homogeneous material.

55. A system according to claim 54, wherein the interference is noise.

56. A system according to claim 54, wherein:

the means for resolving inherent interference resolves the interference by means of a plurality of chaotic attractors, and the means for encoding the signals encodes based on the plurality of chaotic attractors.

57. A system according to claim 54, further including:

a transmission end and a receiving end, each of which includes said means for resolving inherent interference on the channel by means of a chaotic attractor, and said means for resolving at said transmission end synchronizes the chaotic attractor with the means for resolving at said receiving end.

58. A system according to claim 57, wherein:

the means for resolving inherent interference resolves the interference by means of a plurality of chaotic attractors synchronized to each other, and the means for encoding the signals encodes based on the plurality of chaotic attractors.

59. A system according to claim 49, wherein at least a portion of the channel is one chosen from a group consisting of:

a nonconductive material and a nonhomogenous material.

60. A system according to claim 59, wherein the interference is noise.

61. A system according to claim 59, wherein:

the means for resolving inherent interference resolves the interference by means of a plurality of chaotic attractors, and the means for encoding the signals encodes based on the plurality of chaotic attractors.

62. A system according to claim 59, further including:

a transmission end and a receiving end, each of which includes said means for resolving inherent interference on the channel by means of a chaotic attractor, and said means for resolving at said transmission end synchronizes the chaotic attractor with the means for resolving at said receiving end.

63. A system according to claim 62, wherein:

the means for resolving inherent interference resolves the interference by means of a plurality of chaotic attractors synchronized to each other, and the means for encoding the signals encodes based on the plurality of chaotic attractors.

* * * * *